(12) United States Patent
Hennes (10) Patent No.: US 7,488,079 B2
(45) Date of Patent: Feb. 10, 2009

(54) SYSTEM AND METHOD FOR PROJECTING IMAGES ONTO A MOVING SCREEN

(75) Inventor: Tom Hennes, New York, NY (US)

(73) Assignee: Thinc Design, Inc., New York, NY (US)

( * ) Notice: Subject to any disclaimer, the term of this patent is extended or adjusted under 35 U.S.C. 154(b) by 522 days.

(21) Appl. No.: 11/186,417

(22) Filed: Jul. 21, 2005

(65) Prior Publication Data

US 2006/0038965 A1 Feb. 23, 2006

Related U.S. Application Data

(60) Provisional application No. 60/590,000, filed on Jul. 21, 2004.

(51) Int. Cl.
*G03B 21/14* (2006.01)
*G03B 21/26* (2006.01)
*G03B 3/00* (2006.01)
*G03B 21/00* (2006.01)
*G03B 21/56* (2006.01)
*H04N 7/00* (2006.01)
*H04N 13/00* (2006.01)

(52) U.S. Cl. .............................. 353/97; 353/30; 353/70; 353/94; 353/101; 353/121; 359/446; 359/477; 348/44

(58) Field of Classification Search ............... 353/7, 353/10, 94, 97, 121, 28, 30, 69, 70, 101; 345/6, 419; 359/478, 462, 446, 475, 477; 348/42, 44, 51
See application file for complete search history.

(56) References Cited

U.S. PATENT DOCUMENTS

| | | | | |
|---|---|---|---|---|
| 5,678,910 | A | * | 10/1997 | Martin .......................... 353/7 |
| 5,754,147 | A | * | 5/1998 | Tsao et al. ..................... 345/6 |
| 7,059,729 | B2 | * | 6/2006 | Hoshino et al. .............. 353/94 |
| 7,168,809 | B2 | * | 1/2007 | Hoshino et al. ................ 353/7 |

* cited by examiner

*Primary Examiner*—Melissa J Koval
(74) *Attorney, Agent, or Firm*—Leason Ellis LLP (57) ABSTRACT

A shaped screen rotates through one or more projected images of two or more projectors operating simultaneously, resulting in a dynamic, kinetic image surface which may be viewed equally well from a plurality of angles, up to 360° horizontally. By utilizing at least two projectors, the resultant composite image on the rotating screen is not only optimally viewed from any angle, but it is also animated by the movement of the screen itself, as well as by any animation within the projected image.

19 Claims, 5 Drawing Sheets

Synchronization between projector and screen

Fig. 5

SYSTEM AND METHOD FOR PROJECTING IMAGES ONTO A MOVING SCREEN

Priority is claimed under 35 U.S.C. 119 to U.S. Provisional Application Ser. No. 60/590,000, filed on Jul. 21, 2004. The contents of this provisional application is hereby incorporated by reference in its entirety.

FIELD OF THE INVENTION

This invention relates to image projection, processing and displaying systems. More particularly, this invention relates to a method and apparatus for projecting live and/or pre-recorded visual content such as analog or digital video, film, slides and the like onto a centrally-located and movable screen to be viewed substantially simultaneously by an audience through potentially a 360° span without glare, spill-light or keystone distortion effecting the projected image.

BACKGROUND OF THE INVENTION

Most image projection systems consist of a projector and a flat screen. The projector produces an image through still slides, moving film or video. The flat screen receives the projected light and provides viewers with a planar image that is viewable from either one or both sides of the screen. One drawback associated with conventional projection systems that project onto a flat screen is that the picture is best viewed when the viewer's line of sight is precisely normal to the plane of the picture. In such systems, special consideration must be given to the positioning of the display within its environment because, typically, conventional projection systems, such as those used in movie theaters, cannot be viewed from the rear or extreme sides. Thus, the area within which a viewing audience can be accommodated is limited to locations with suitable sight lines. This ideal condition is difficult to realize when several people wish to view the picture simultaneously from varied locations.

Sometimes multiple flat screens are used in conjunction with each other to partially surround an audience with imagery, or to place imagery in the center of a theatre which can be viewed from multiple sides. What all these systems have in common is that the screen itself provides a static framework onto which a still or moving image is projected. Any movement or dynamism is provided exclusively by the medium which is projected; the environment for the projected light is always static, and the view of any one screen is optimal for only a relatively narrow angular displacement from the center of that screen.

In an attempt to overcome the viewing limitations associated with conventional projection systems, the present invention can provide up to a 360° viewing system including a shaped, revolving screen. Projecting an image on a shaped, revolving screen presents several problems that will be apparent to those of skill in the art. First, the shape of the image surface (the screen) is not flat, but rather is contoured. Second, the screen is not static, it is dynamic in its rotation around a center axis. The varying shape of the screen, the screen's movement, its resultant cone of projection, and the screen's angular displacement from the projection device create a constantly changing area of projection. The problem is two-fold. First, glare from the projection source is apparent to a viewer standing on the opposite side of the rotating screen around one or more of its edges as it moves. Second, the resultant spill-light of portions of the image that miss the screen as it rotates fall upon the background surface of the theatre, its ceiling or floor surfaces, creating distracting patterns of light.

Additionally, when the projection axis of the system is not perpendicular to the viewing screen, a portion of the projected image may appear distorted (e.g., stretched or compressed). This distortion is commonly known as keystone distortion. For example, if the projector is situated above a line normal to the viewing area of the screen, then the image must be projected downward to the screen. As a result, the upper portion of the image may appear expanded or stretched in relation to the lower potion of the image, or the lower portion may appear condensed or contracted compared to the upper portion. The projected image may thus take on a trapezoidal or keystone shape. Depending upon the resolution or detail of the image being projected, the distortion may significantly degrade one's appreciation of the image. The present invention addresses these and other needs.

SUMMARY OF THE INVENTION

The present invention offers a different approach to conventional image presentation by utilizing a dynamically moving screen. In one embodiment, a shaped screen rotates through one or more projected images of two or more projectors operating simultaneously, resulting in a dynamic, kinetic image surface which may be viewed equally well from a plurality of angles, up to 360° horizontally. By utilizing at least two projectors, the resultant composite image on the rotating screen is not only optimally viewed from any angle, but it is also animated by the movement of the screen itself, as well as by any animation within the projected image.

In accordance with one aspect of the invention, an imaging and display system for the display of visual-media content over a wide-angle field extending up to a full 360° azimuth is provided. The system provides presentations of still or moving images on a screen-display which is formed or shaped, supported and configured for rotation on at least one rotational axis of the system, and to optionally do so with synchronous and/or panning audio. The system also provides for support means for supporting the shape of any of a variety of screen-displays and to provide circumnavigable viewing of the display, or a multitude of vantage points exterior to the perimeter of the display, from which to view the visual content.

The present invention solves the above-described problems associated with projecting an image on a shaped, revolving screen by electronically synchronizing the motion of the screen to the projected image while providing for a black "moving matte" to be synchronously incorporated into the original image, thus compensating for the motion of the screen and its resultant shift in shape relative to the source of image projection to minimize or eliminate glare and spill-light. The black "moving matte" effectively blocks all of the image area that is at any given moment extraneous to the rotating screen.

In like manner, the screen can be translated or moved other than by rotation with a dynamic moving matte synchronously compensating for screen movement to minimize or eliminate glare and spill-light. A camera connected at the projection axis of each projector is configured to record a distorted image and send it to a signal processor capable of determining a projective transformation matrix. Using the projective transformation matrix, the signal processor determines the parameters for the matte. The matte is then sent to the respective projector and projected onto the screen along with image data. The black matte effectively blocks all of the image area that is at any given moment extraneous to the rotating screen. According to an alternative arrangement, the construction of the matte may be performed manually using various digital editing tools available in the art. The system also provides for keystone correction in a projector arbitrarily oriented with respect to the screen.

The screen can be configured having sufficient dimensions to facilitate either close proximity viewing, such as in theaters, hotel lobbies, amusement parks and the like, or viewing at a distance, and in the latter case, can readily be employed in arenas, stadiums and other large audience venues adapted to house and operate projection systems and arrangements. The display system can readily be employed as a multimedia learning center for use in educational and/or research facilities, such as in museums to increase awareness of specific exhibits on display or to educate an audience by surrounding them with a compilation of images and sound.

These and further objectives, features and advantages of the present invention will become more apparent from the following description when taken in connection with the accompanying drawings which show, for purposes of illustration only, several embodiments in accordance with the present invention.

DETAILED DESCRIPTION OF THE PREFERRED EMBODIMENTS

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Various apparatuses and methods are described below for projecting an image onto a rotating shaped-screen utilizing at least two projectors operating simultaneously in a manner that allows optimal viewing equally well from a plurality of angles relative to the screen, up to 360° horizontally, eliminates glare from the projection source, blocks all of the image area that is at any given moment would be extraneous to the rotating screen relative to a given projector, and minimizes or eliminates keystone distortion caused by arbitrarily oriented projectors. As will be seen, other advantages will be realized as well, such as correcting for focus distortions in the projector. Additionally, while the present invention is described for use with a shaped-screen it can be equally applied to overcome the disadvantages brought about by moving (e.g., rotating or translating) a planar screen.

Figure 1:
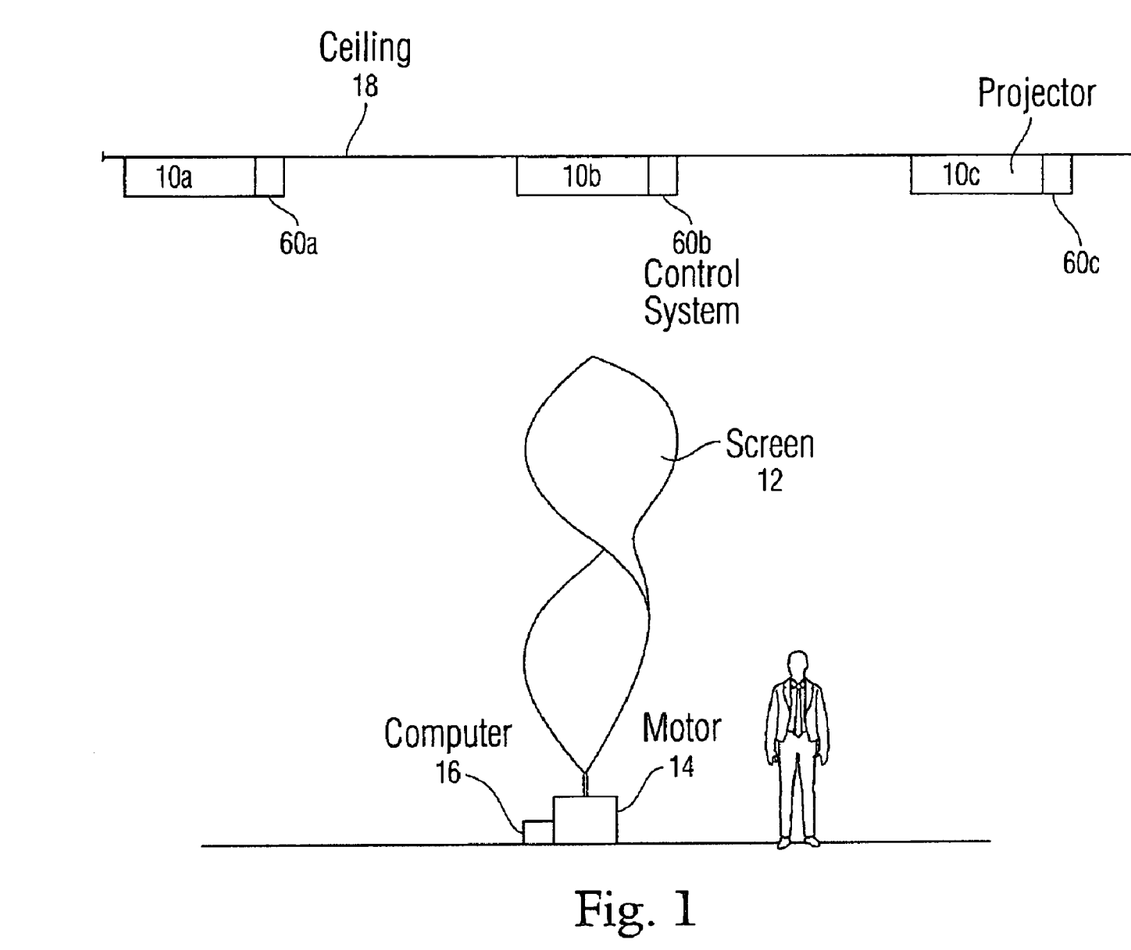
Figure 2:
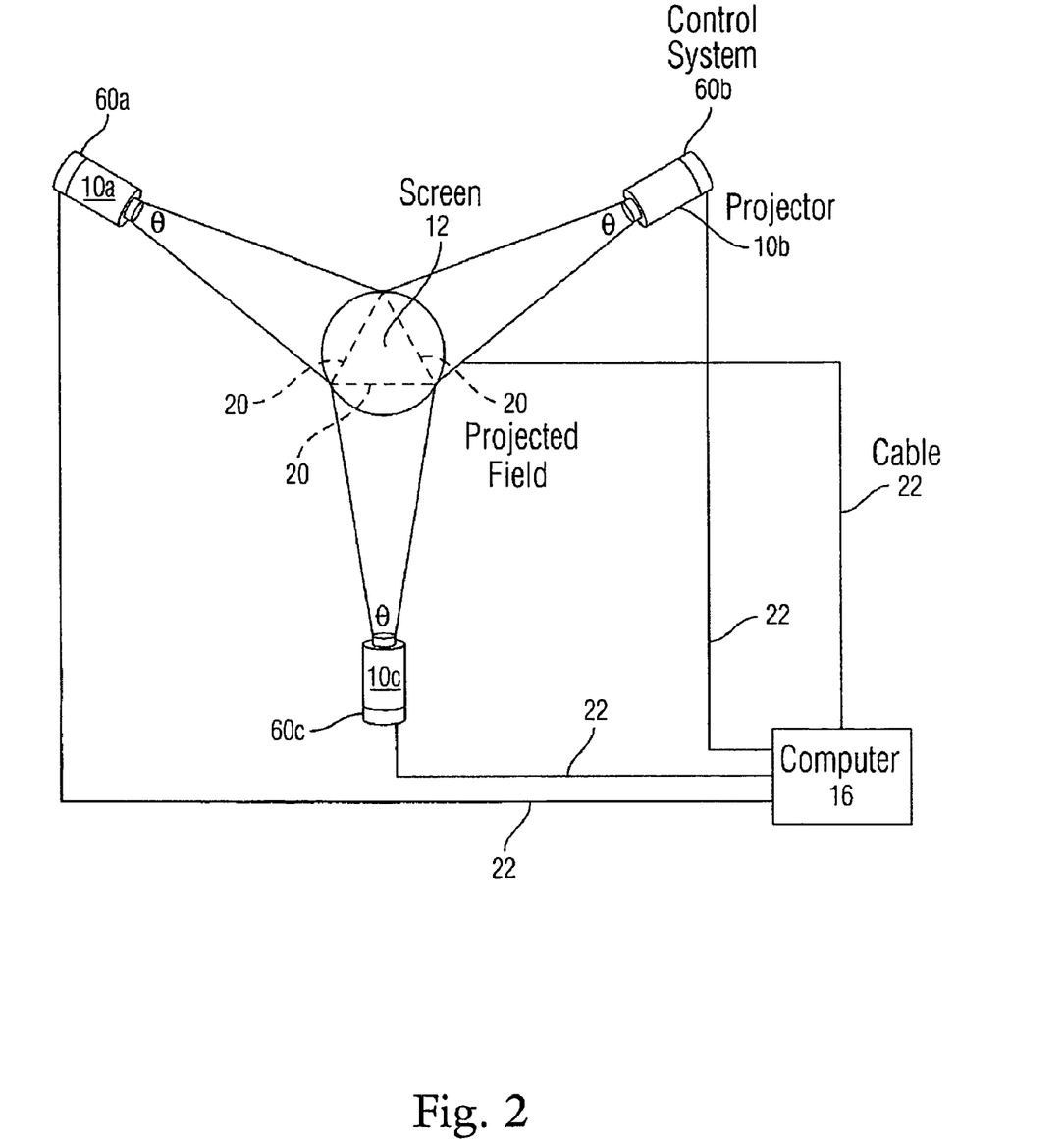

Referring now to FIGS. 1 and 2, a perspective view of a video and image projection system according to a preferred embodiment of the present invention is shown. The system includes three equally spaced image projection units 10a, 10b and 10c for projecting images, a shaped screen 12, a motor 14 for rotating screen 12 and a computer 16 for controlling screen 12 and projectors 10a, 10b and 10c. Computer 16 may be a desktop or portable computer and is interfaced with projectors 10a, 10b and 10c via a cable 22. Cable 22 conveys image and/or video data stored in computer 16 to projectors 10a, 10b and 10c for projecting an image upon screen 12. Computer 16 can be locally or remotely located relative to the projectors with any one or more of a variety of signal-conveying connections other than a conventional cable. For example, communication can be by powerless signal transfer, fiber optic cable, wireless transmission (e.g., cellular, UWB, Bluetooth™, etc.), and the like. A presentation application program may be run on computer 16 to allow a user to generate and store images in computer 16 as well as transmit the images to projectors 10a, 10b and 10c via cable 22 for presentation. Referring to FIG. 2, the projectors, when so configured, whether projecting film or video images, can each be assigned or allocated a projected field and segment 20 which can be synchronized with other projected segments and the rotation of screen 12. Dashed lines are used to approximate the assigned or allocated projection field 20 of each of the projectors 10a, 10b and 10c.

Figure 3:
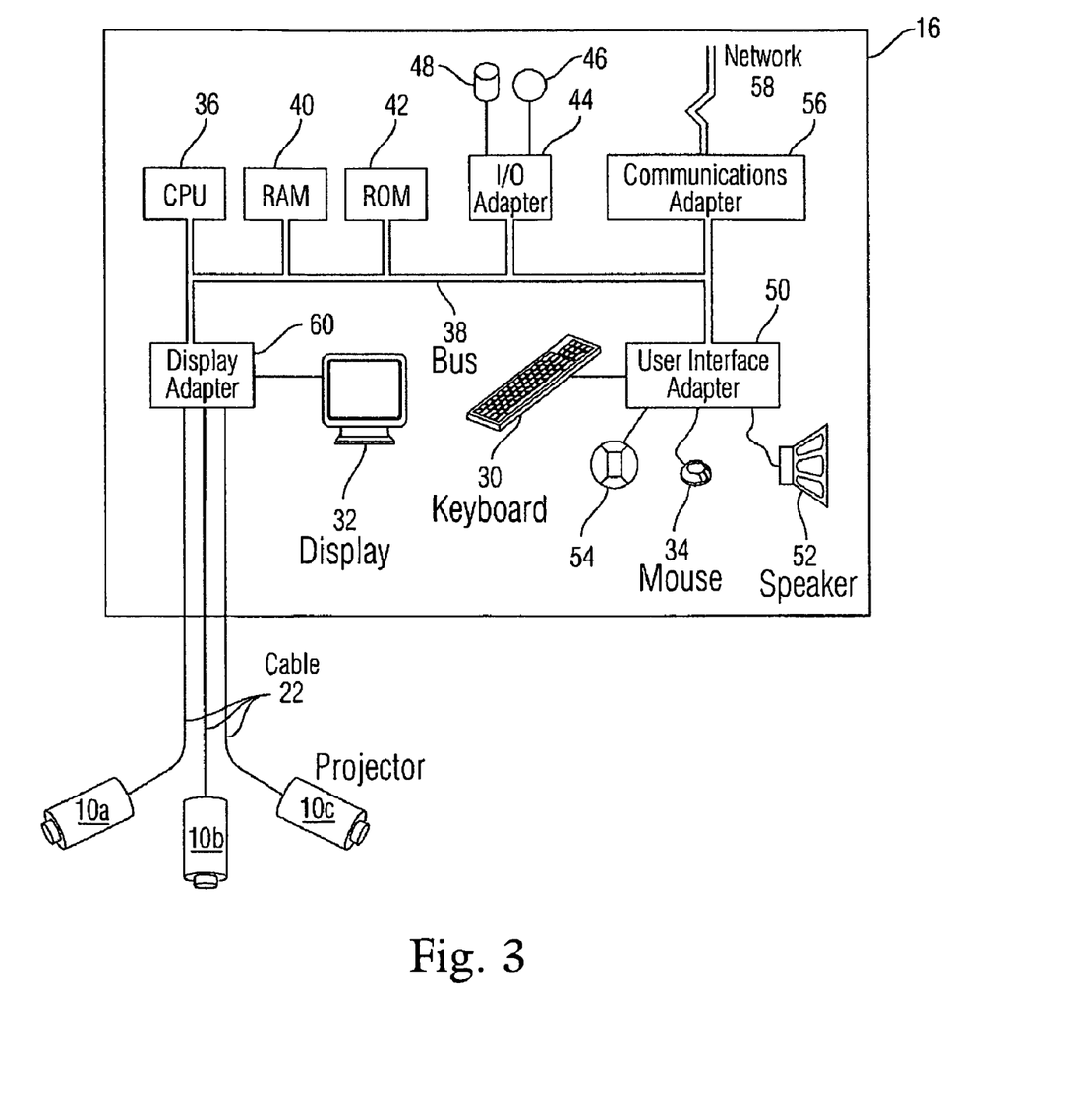

Referring now to FIG. 3, a detailed block diagram of computer 16 depicted in FIGS. 1 and 2 according to the preferred embodiment of the present invention is shown. Computer 16 includes a keyboard 30, display device 32, and a pointing device 34. Keyboard 30 permits entry of textual information into the computer via depression of one or more of a plurality of keys. Pointing device 34 is an input device permitting control over the graphical user interface of the operating system (e.g., a Microsoft Windows™ operating system). For example, pointing device 34 permits a user to control the movement of a pointer within the graphical user interface. The invention is not limited to any particular pointing device 34, although a conventional touchpad, mouse, wheel, trackball, or joystick will suffice. Display device 32 permits display of information by the computer. The invention is not limited to any particular display device 32. In the case of a portable computer 16, display device 32 is conventionally a LCD (liquid crystal display) screen. In the case of a non-portable computer 16, display device 32 is conventionally a monitor housing a cathode ray tube (CRT).

Computer 16 includes at least one central processing unit (CPU/signal processor 36). CPU 36 is interconnected via system bus 38 to random access memory (RAM 40), read-only memory (ROM 42), and input/output (I/O) adapter 44 for connecting peripheral devices such as disk units 46 and tape drives 48 to bus 38, user interface adapter 50 for connecting keyboard 30, pointing device 34, speaker 52, microphone 54 to bus 38, communication adapter 56 for connecting computer 16 to an information network 58 such as the Internet, and display adapter 60 for connecting bus 38 to display device 32 and projectors 10a, 10b and 10c. All of these components and adaptors are conventional and form no part of the present invention.

In the preferred embodiment, computer 16 comprises at least one processor 36, memory 40 and/or 42 operably associated with processor 36, and projectors 10a, 10b and 10c operably associated with processor 36 and memory 40 and/or 42. As shown in FIG. 3, computer 16 is operably coupled to projectors 10a, 10b and 10c via cable 22 through the display adapter 60. In another embodiment, each of the projectors 10a, 10b and 10c may include, i.e., house, its own computer 16 and, in particular, its own processor 36 and memories 40 and 42. Projectors 10a, 10b and 10c are configured to project image or video data storable in memories 40, 42 and include an embedded program of instructions configured to be executed by processor 36 and stored in memory 40, 42. The embedded program includes instructions configured to correct keystoning and focal distortion of the image projected by the projectors. The embedded program also implements image transformation algorithms already known in the art to transform portions of a projected image.

In accordance with a salient aspect of the invention, computer 16 executes an application program that causes the projectors to incorporate into the image or video data in memories 40, 42 matte information which is dynamically adjusted in time or with each projected still image, or both.

Figure 5:
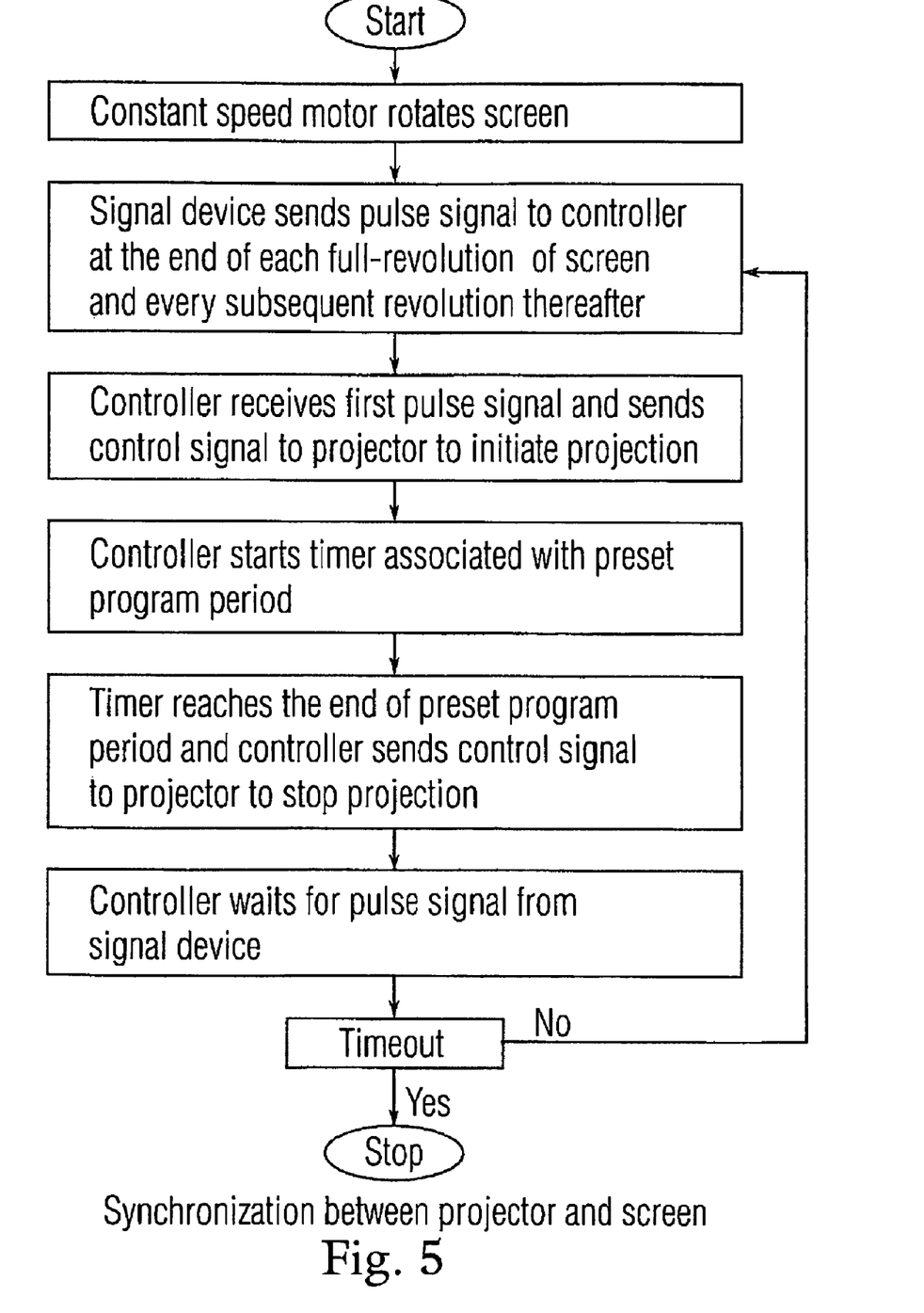

Computer 16 is connected to rotating screen 12 via motor 14. Control devices 60a, 60b and 60c are connected to projection units 10a, 10b and 10c, respectively (FIG. 1). Referring to FIG. 5, the motion of screen 12 can be electronically synchronized with the projected image as follows. Motor 14 is preferably a constant-speed motor and is in communication with computer 16 which is operable to send an electrical pulse signal to control devices 60a, 60b and 60c. Computer 16 is programmed to send a pulse signal at each full revolution of screen 12 and can be implemented, for example, using optical or mechanical sensors that are responsive to rotation of the shaft of the motor 14. Each control device 60a, 60b, 60c is programmed or configured to allow its respective projector to begin projection after receiving a first electrical pulse signal from computer 16. Upon receiving the first pulse signal, each control device starts a timer having a program period and ignores any subsequent pulse signal from the computer until the timer reaches the end of the program period. Once the timer reaches the end of the program period, control devices 60a, 60b and 60c instruct their respective projectors to stop projection until the control devices receive the next pulse signal indicating the start of a projection cycle. Preferably, the time between the end of the program period and the next pulse signal from the computer can be made sufficiently short such that a viewer perceives projection of each program to be continuous. This timing mechanism is one of several ways to better ensure synchronization of the screen position to the content being projected.

By synchronously incorporated a dynamic black matte 70 (FIG. 4) into the original projected image, the problems of glare from image projectors 10a, 10b and 10c (which can be apparent to a viewer standing on the opposite side of the rotating screen around one or more of its edges as it moves) and spill-light (due to a portion of the image missing the rotating screen) can be resolved. The matte can compensate for the motion of the screen and its resultant shift in shape relative to each image projector by effectively blocking all of the image area that is at any given moment extraneous to the rotating screen.

Figure 4:
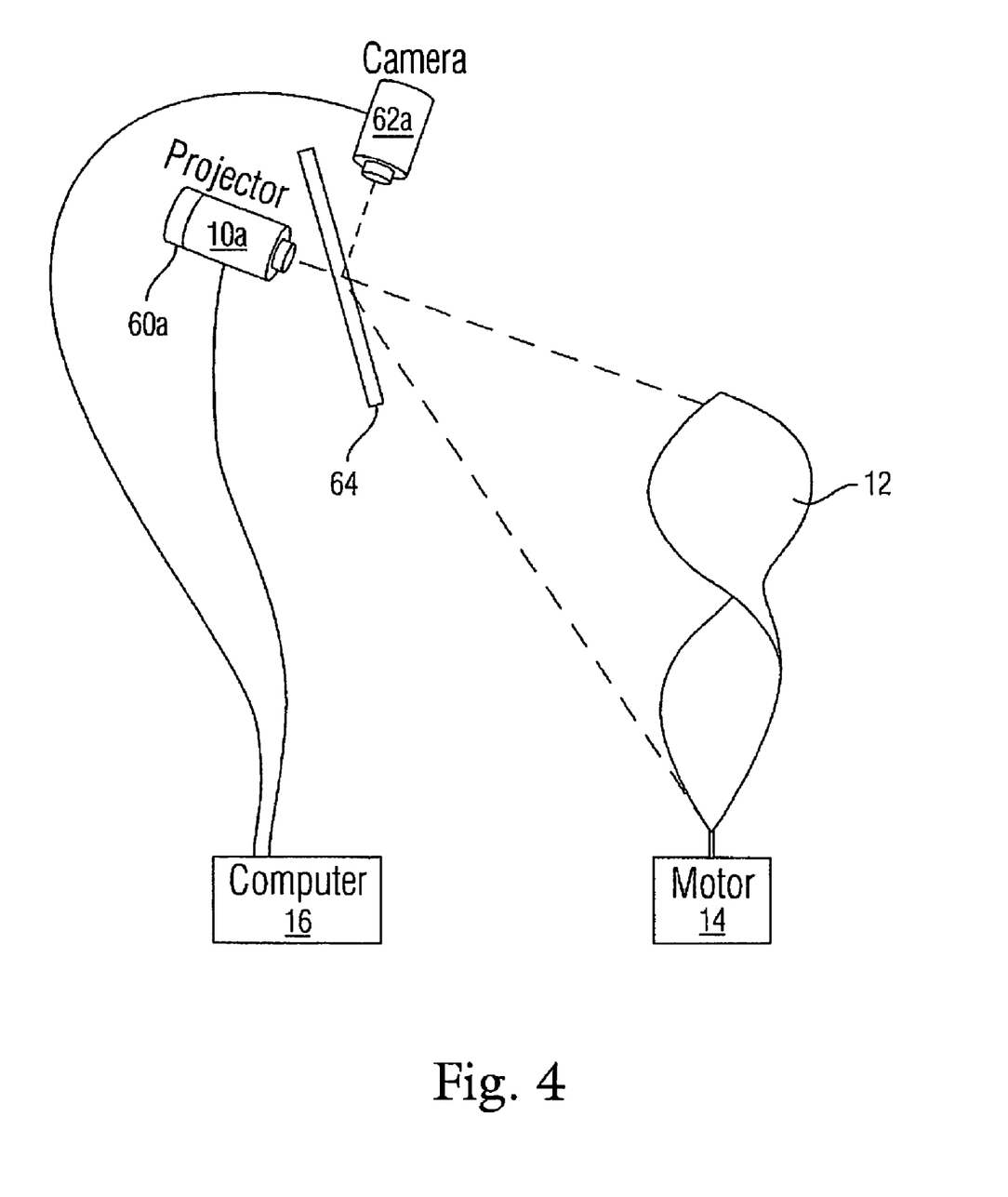

Referring to FIG. 4, one solution for the creation of matte 70 is provided by including a cameras 62a, 62b and 62c at the optical center of projectors 10a, 10b and 10c, respectively. A conventional beam splitter 64 can be placed between the output of projector 10a and the input of camera 62a allowing camera 62a to essentially record an image on screen 12, from the vantage point of the optical center of projection of projector 10a. Referring to FIG. 7, camera 62a sends the recorded image to computer 16. Computer 16 takes the image and determines a dynamic black matte specific to the particular projector that projected the image (in this case projector 10a). Next, computer 16, utilizing signal processor 36, takes the distorted image recorded by camera 62a and creates a modified image incorporating the dynamic black matte. The modified image generated by signal processor 36 is then sent by computer 16 to projector 10a and projected therefrom onto the screen 12 creating a dynamic image free of glare and spill light.

As illustrated in FIGS. 1 & 2, screen 12 is irregularly shaped with several grooves and contours. However, a contoured screen is not essential to the invention insofar as a conventional flat screen could be used. As mentioned above with reference to FIG. 2, projectors 10a, 10b and 10c each exhibit a projected field 20 illustrated in dashed lines. As shaped screen 12 rotates by way of constant-speed motor 14 it continuously moves into and out-of the projected field 20 of each image projector 10a, 10b and 10c. Accordingly, if each projected field 20 can accurately project its images onto screen 12 as the screen rotates through 120°, three projectors spaced at 120° intervals of the screen's rotation can be used to continuously project an image onto screen 12 while it rotates through 360°. As screen 12 rotates through the projection field 20 of projectors 10a, 10b, 10c a dynamic, kinetic image surface is produced which may be viewed equally well from a plurality of angles, up to 360° about an axis.

According to a preferred embodiment of the present invention, image projectors 10a, 10b and 10c are mounted to ceiling 18 and spaced equidistant apart from each other at 120° intervals along screen 12's rotation. In this arrangement, projectors 10a, 10b and 10c are higher than the center of screen 12 in which case the optical axis is tilted downward from the horizontal which is preferred for presentation in which persons may be moving about the screen. Referring to FIG. 6b, assuming that screen 12 is flat, the angle of the optical axis relative to the projection screen 12 results in a distorted image 59 on screen 12. In distorted image 59 a horizontal line H at the bottom of the image will appear shorter, on the screen, than a horizontal line H' at the top of the image (so called "keystoning"). Parallel vertical lines V, V' will appear to be further apart at the top of the image than at the bottom of the image. There will also be focus differences between the top of the screen and the bottom of the screen which can not be corrected by intentionally distorting the image, although using a projector lens with ample depth of field can eliminate this problem.

Keystone distortion can be corrected by adjusting the plane of projection so it is perpendicular to screen 12. However, the present projection system is desired to be viewed through 360° and does not easily lend itself to this projection arrangement. Referring to FIG. 1, positioning image projectors 10a, 10b and 10c perpendicular with the center of screen 12 places the projectors in the line of sight of patron viewers and could result in dangerous conditions, such as projecting light directly into a viewers eyes or adding additional distortion to the projected image by projecting through the crowd of viewers standing in the area between the projectors and the screen 12.

Returning to FIG. 6b, when the projector is placed obliquely or the screen is tilted, the obliqueness can be expressed in terms of the elevation angle 51. Elevation angle 51 is equal to the angle between the actual angle of the optical axis and the ideal angle of the optical axis, i.e., perpendicular to the screen. In the ideal setup, as shown in FIG. 5a, elevation angle 51 is zero. According to a preferred embodiment, elevation angle 51 is known or can be determined automatically using sensors such as laser sensors, magnetic sensors, or gyro sensors mounted on each projector. FIG. 7 shows the steps of warping an image to correct for keystone distortion. CPU 36 is either pre-programmed with elevation angle 51 or receives information regarding elevation angle 51 from control devices 20a, 20b and 20c. Typically, CPU 36 generates 70 a rectangular image 72, having corners generally marked A, B, C and D. Using elevation angle 51, CPU 36 determines a suitable quadrilateral 77, which when projected onto screen 16, appears as a correctly displayed image 80, i.e., the image is rectangular and axis aligned with the real world sense of what is horizontal and vertical. CPU 36 converts 74 the image 72 into the quadrilateral (warped) image 77. The warping can be performed by texture mapping or image warping such as is available in conventional rendering engines. Lastly, CPU sends image 77 to controller 60a of obliquely positioned projector 10a for projection 79 on screen 12 resulting in the correct axis aligned rectangle displayed image 80.

While only elevation angle 51 is shown in FIG. 6b, one of ordinary skill in the art will recognize that the position of projector 10*a* with respect to screen 12 can be expressed in terms of more than one angle. For example, in addition to being raised a distance above a line normal to screen 12, projector 10*a* can be tilted or rolled along another one of its axes. Accordingly, the obliqueness can be expressed in terms of the three angles, elevation, roll and azimuth. As discussed above with regard to elevation angle 51, the roll and azimuth angles can be known or determined automatically using sensors mounted on the projector. In this case, CPU 36 will take as input all three angles when determining the proper warped image to output to projector 10*a* and performing the same transformation for azimuth and a roll connection by reversing the roll digitally.

According to a preferred embodiment, the projection system of the present invention includes audio means for audibly enhancing the visual circularity of action projected on screen 12 by synchronizing sound to the images. An array of speakers (not shown) can be positioned adjacent to, or near to, the perimeter of screen 12. Speakers can be positioned in a manner typically used for suspending speakers, and if necessary can be driven by audio amplifiers each connected with at least one audio source to provide the desired audible sound.

A system for projecting images onto a moving, nonplanar screen can be characterized by the following points. An image projection system which may viewed horizontally equally well up to 360° comprises: a mechanically rotating screen that has an ascertainable position; at least two projectors operable to project an image, each projector including a mask synchronously incorporated into the image; and synchronization means between the rotating screen and the image such that the mask blocks all of the image that is at any given moment extraneous to the rotating screen.

The image projection system characterized by the above described points, further comprises: a control system connected to the at least two projectors; a constant-speed motor affixed to the rotating screen, wherein the motor includes, or is in communication with, a signal device operable to send an electrical pulse signal to the control system at each full revolution of the rotating screen; the control system programmed to begin projection and to start a timer associated with a preset program period, including a beginning and an end, after receiving a first electrical pulse signal from the signal device and to ignore each subsequent pulse signal until the timer reaches the end of the preset program period; and the control system programmed to pause projection when the timer reaches the end of the preset program period and to wait for a next pulse signal to resume projection, wherein a time interval between the end of the preset program period and the next pulse signal is sufficiently short such that a viewer perceives projection of each program to be continuous.

The image projection system characterized by the above described points, further comprises keystone distortion correction means for projecting a distortion free image. The distortion correction means includes modifying an electronic image to be projected so as to change the electronic image to produce a distortion free projected image; and keystone distortion correction means of the mask for producing a distortion free mask.

The image projection system characterized by the above described points, further comprises focus distortion correction means on the at least two projectors for projecting the image in proper focus onto the screen.

The image projection system according to the points above wherein the mask is a dynamic digital mask edited into the image.

The image projection system characterized by the above described points, further comprises: a camera connected at an optical center of projection of each projector, the camera operable to record a projected image; the camera operable to send a recorded image to a central processing unit (CPU) connecting thereto, wherein the CPU is capable of determining a projective transformation matrix from the recorded image; the CPU connected to a signal processor operable to create a modified image from the recorded image according to the projective transformation matrix received from the CPU; and the signal processor operable to send the modified image to the projector, wherein the projector projects the modified image onto the screen.

An image projection method for generating an image that may viewed horizontally equally well up to 360° comprises: rotating a screen that has an ascertainable position; projecting a distorted image including a synchronously-incorporated distorted mask caused by at least one of an adverse angle of projection and a rotating screen; recording the distorted image and mask at an optical center of projection on a recording medium using a camera; performing keystone distortion correction on the distorted image and mask using a signal processor connected to the camera; modifying the distorted image and mask to compensate for the keystone distortion; projecting the modified image and mask onto the screen to produce a distortion free projected image; and controlling the timing of the projection steps through the use of a timing signal managed by a control computer such that the modified image and the rotating screen are synchronized resulting in the modified mask blocking all of the image that is at any given moment extraneous to the rotating screen.

I claim:

1. An image projection system for presenting an image to a viewer, comprising:
   a mechanically rotating screen that has an ascertainable position;
   at least two projectors operable to project an image, each projector including a mask synchronously incorporated into the image, wherein the mask is a dynamic digital mask edited into the image; and
   synchronization means between the rotating screen and the image such that the mask blocks from the viewer all of the image that is at any given moment extraneous to the rotating screen.

2. An image projection system according to claim 1 further comprising:
   keystone distortion correction means of said image for producing a distortion free projected image, wherein said distortion correction means includes modifying an electronic image to be projected so as to change the electronic image to produce a distortion free projected image; and
   keystone distortion correction means of said mask for producing a distortion free mask.

3. An image projection system according to claim 1 further comprising:
   focus distortion correction means on said at least two projectors for projecting the image in proper focus onto the screen.

4. An image projection system according to claim 1 wherein said at least two projectors are arranged about an axis of rotation of the screen.

5. An image projection system according to claim 1 wherein the synchronization means between the rotation of the screen and the image is maintained within 2° of rotation.

6. An image projection system for presenting an image to a viewer, comprising:
   a mechanically rotating screen that has an ascertainable position;

at least two projectors operable to project an image, each projector including a mask synchronously incorporated into the image;

synchronization means between the rotating screen and the image such that the mask blocks from the viewer all of the image that is at any given moment extraneous to the rotating screen;

a control system connected to said at least two projectors;

a constant-speed motor affixed to the rotating screen, wherein the motor includes a signal device operable to send an electrical pulse signal to the control system at each full revolution of the rotating screen;

said control system programmed to begin projection and to start a timer associated with a preset program period, including a beginning and an end, after receiving a first electrical pulse signal from the signal device and to ignore each subsequent pulse signal until the timer reaches the end of the preset program period; and said control system programmed to pause projection when the timer reaches the end of the preset program period and to wait for a next pulse signal to resume projection, wherein a time interval between the end of the preset program period and the next pulse signal is sufficiently short such that a viewer perceives projection of each program to be continuous.

7. An image projection system according to claim 6, further comprising:

keystone distortion correction means of said image for producing a distortion free projected image, wherein said distortion correction means includes modifying an electronic image to be projected so as to change the electronic image to produce a distortion free projected image; and keystone distortion correction means of said mask for producing a distortion free mask.

8. An image projection system according to claim 6, further comprising:

focus distortion correction means on said at least two projectors for projecting the image in proper focus onto the screen.

9. An image projection system according to claim 6, further comprising:

a camera connected at an optical center of projection of each projector, the camera operable to record a projected image;

said camera operable to send a recorded image to a central processing unit (CPU) connecting thereto, wherein the CPU is capable of determining a projective transformation matrix from the recorded image;

said CPU connected to a signal processor operable to create a modified image from the recorded image according to the projective transformation matrix received from the CPU; and said signal processor operable to send the modified image to the projector, wherein the projector projects the modified image onto the screen.

10. An image projection system according to claim 6, wherein said at least two projectors are arranged about an axis of rotation of the screen.

11. An image projection system according to claim 6, wherein the synchronization means between the rotation of the screen and the image is maintained within 2° of rotation.

12. An image projection system for presenting an image to a viewer, comprising:

a mechanically rotating screen that has an ascertainable position;

at least two projectors operable to project an image, each projector including a mask synchronously incorporated into the image;

synchronization means between the rotating screen and the image such that the mask blocks from the viewer all of the image that is at any given moment extraneous to the rotating screen;

a camera connected at an optical center of projection of each projector, the camera operable to record a projected image;

said camera operable to send a recorded image to a central processing unit (CPU) connecting thereto, wherein the CPU is capable of determining a projective transformation matrix from the recorded image;

said CPU connected to a signal processor operable to create a modified image from the recorded image according to the projective transformation matrix received from the CPU; and said signal processor operable to send the modified image to the projector, wherein the projector projects the modified image onto the screen.

13. An image projection system according to claim 12, further comprising:

keystone distortion correction means of said image for producing a distortion free projected image, wherein said distortion correction means includes modifying an electronic image to be projected so as to change the electronic image to produce a distortion free projected image; and keystone distortion correction means of said mask for producing a distortion free mask.

14. An image projection system according to claim 12, further comprising:

focus distortion correction means on said at least two projectors for projecting the image in proper focus onto the screen.

15. An image projection system according to claim 12, further comprising:

a camera connected at art optical center of projection of each projector, the camera operable to record a projected image;

said camera operable to send a recorded image to a central processing unit (CPU) connecting thereto, wherein the CPU is capable of determining a projective transformation matrix from the recorded image;

said CPU connected to a signal processor operable to create a modified image from the recorded image according to the projective transformation matrix received from the CPU; and said signal processor operable to send the modified image to the projector, wherein the projector projects the modified image onto the screen.

16. An image projection system according to claim 12, wherein said at least two projectors are arranged about an axis of rotation of the screen.

17. An image projection system according to claim 12, wherein the synchronization means between the rotation of the screen and the image is maintained within 2° of rotation.

18. An image projection method for generating an image for viewing by viewer, comprising:

rotating a screen that has an ascertainable position;

projecting a distorted image including a synchronously-incorporated distorted mask caused by at least one of an adverse angle of projection and a rotating screen;

recording the distorted image and mask at an optical center of projection on a recording medium using a camera;

performing keystone distortion correction on the distorted image and mask using a signal processor connected to the camera;

modifying the distorted image and mask to compensate for the keystone distortion; and projecting the modified image and mask onto the screen to produce a distortion free projected image; and controlling the timing of said projection steps through the use of a timing signal managed by a control computer such that the modified image and the rotating screen are synchronized resulting in the modified mask blocking from the viewer all of the image that is at any given moment extraneous to the rotating screen.

19. An image projection method according to claim 18, wherein the projecting step utilizes a distorted digital mask dynamically edited into the distorted image.

* * * * *